US010937007B2

(12) United States Patent
Root et al.

(10) Patent No.: US 10,937,007 B2
(45) Date of Patent: Mar. 2, 2021

(54) ELECTRONICALLY TRACKING VEHICLE STATE IN A VEHICLE MAINTENANCE FACILITY

(71) Applicant: Rygir Holdings, American Fork, UT (US)

(72) Inventors: Donna M. Root, American Fork, UT (US); Jeffrey Lee Rasmussen, South Jordan, UT (US)

(*) Notice: Subject to any disclaimer, the term of this patent is extended or adjusted under 35 U.S.C. 154(b) by 122 days.

(21) Appl. No.: 16/181,329

(22) Filed: Nov. 5, 2018

(65) Prior Publication Data
US 2020/0143332 A1 May 7, 2020

(51) Int. Cl.
G06Q 10/00 (2012.01)
G06Q 10/06 (2012.01)
G01S 19/46 (2010.01)
(52) U.S. Cl.
CPC ..... *G06Q 10/20* (2013.01); *G06Q 10/063114* (2013.01); *G01S 19/46* (2013.01)
(58) Field of Classification Search
None
See application file for complete search history.

(56) References Cited

U.S. PATENT DOCUMENTS

| 2002/0007289 | A1* | 1/2002 | Malin | G06Q 40/08 |
| | | | | 705/4 |
| 2013/0337733 | A1* | 12/2013 | Williams | B05B 14/43 |
| | | | | 454/52 |
| 2014/0188999 | A1* | 7/2014 | Leonard | H04L 12/1859 |
| | | | | 709/204 |
| 2014/0330604 | A1* | 11/2014 | Connolly | G06Q 10/06316 |
| | | | | 705/7.15 |
| 2015/0302323 | A1* | 10/2015 | Connolly | G06Q 10/0633 |
| | | | | 705/7.27 |
| 2018/0259945 | A1* | 9/2018 | Sillay | G05B 19/41865 |
| 2018/0357288 | A1* | 12/2018 | Costantino | G06F 16/248 |

* cited by examiner

*Primary Examiner* — Mehmet Yesildag
(74) *Attorney, Agent, or Firm* — Dodd Law Group; Michael B. Dodd

(57) ABSTRACT

The present invention extends to methods, systems, and computer program products for electronically tracking vehicle state in a vehicle maintenance facility. When a vehicle enters a maintenance facility, maintenance facility personnel can assess the vehicle and assign a vehicle collision repair and/or maintenance workflow for performing indicated repairs and/or maintenance. The vehicle can also be assigned an identifier and fitted with one or more transmitters. As a vehicle moves between workstations and/or staging areas, the one or more transmitters continually transmit. A server uses signals from the transmitters to track vehicle progress through the vehicle maintenance workflow. If constraints of the maintenance workflow are violated (e.g., a vehicle is at a workstation to long), the server notifies relevant parties.

14 Claims, 8 Drawing Sheets

ELECTRONICALLY TRACKING VEHICLE STATE IN A VEHICLE MAINTENANCE FACILITY

CROSS-REFERENCE TO RELATED APPLICATIONS

Not Applicable.

BACKGROUND

1. Background and Relevant Art

After an accident, a damaged vehicle may require any number of different types of repairs to return the vehicle to safe and functional operation. For example, a vehicle may require one or more of mechanical repairs, interior repairs, external body repairs, paint, etc. Some vehicle repair shops include capabilities to perform each of these types of repairs as well as others. These vehicle repair shops can include different workstations designed to perform particular types of repairs. Different workstations can be designed and specialized for particular types of repairs.

For example, a vehicle repair shop can include: one or more mechanical repair stations where workers can perform mechanical repairs, one or more interior repair stations where workers can perform interior repairs, one or more body stations where workers can perform body work on a vehicle interior and/or exterior, one or more paint stations where workers can paint a vehicle exterior. A vehicle repair shop can also include other stations, such as, for example, a wash station, a polish station, a quality assurance station, etc. Depending on volume of vehicles repaired, a repair shop can include multiple stations of a particular type.

Depending on indicated repairs, a vehicle can be moved between different stations in a specified order (sometimes returning to prior stations). Upon vehicle intake, service personnel can access vehicle damage and/or may be provided a list of requested repairs from an insurance company. Based on needed/estimated repairs, service personnel can determine an ordered sequence of workstations to facilitate the needed repairs. For example, if a vehicle has body damage and needs paint. The vehicle can be scheduled for an estimate station, a body repair station, a paint station, a wash station, a polish station, and a quality assurance station in that order.

Between stations, vehicles can be parked in a parking lot. When the next station for a vehicle is available, the vehicle can be moved from the parking lot to the station. When work at the station is completed, the vehicle can be moved to a next station, or if the next station is not available, back to the parking lot. As such, vehicles are frequently moved between stations and the parking lot.

Many repair shops are required to meet various performance requirements to maintain favor with insurance companies including quality or work, reporting, and timeliness. Failure to satisfy performance requirements can lead to insurance companies taking business elsewhere. As such, repair shops are under constant pressure to know the real time status and location of all vehicles being repaired at all times to provide updates to insurance companies.

As such, repair shops often utilize computers and databases to help track vehicles going through a repair process. Upon vehicle intake, service personnel can enter a repair sequence for a vehicle into the database. The vehicle can then be moved to a parking lot. As the vehicle is moved between stations (and the parking lot) and repairs are performed, service personnel can manually enter updates into the database. Thus, a record of the vehicle's movement, performed repairs, and current location can be tracked to some extent.

However, since data is entered manually there is always the possibility of human error. Further, many service personnel may forget to enter data, may lack technical skills, or may simply choose not to update the database. Service personnel may also make fraudulent entries to make a repair process appear to be further along that it actually is.

In response to an insurance company inquiry, a service manager can attempt to determine a vehicle status. The service manager can check the database to identify preliminary vehicle information. However, to determine most recent repair activity as well as to validate what is reflected in the database, the service manager and/or the estimator must physically locate and examine the vehicle prior to reporting back to the insurance company. It may also be that discrepancies are identified between information reflected in the database and actual vehicle condition. The service manager may attempt to resolve those discrepancies and update the database with more accurate information before reporting back to the insurance company. If repairs for a vehicle are not meeting performance requirements, the service manager can also increase the priority of repairing the vehicle.

BRIEF SUMMARY

Examples extend to methods, systems, and computer program products for electronically tracking vehicle state in a vehicle maintenance facility.

When a vehicle enters a collision or maintenance (e.g., repair, paint, etc.) facility, maintenance facility personnel can assess the vehicle and determine a vehicle maintenance workflow for performing indicated maintenance. The maintenance personnel can assign the vehicle maintenance workflow to the vehicle. The vehicle maintenance workflow defines an ordered sequence of locations the vehicle is to pass through and corresponding time constraints per location to complete a vehicle maintenance process. At least some locations in the ordered sequence include workstations corresponding to maintenance tasks to be performed on the vehicle. For example, locations can include workstations for performing one or more of: mechanical repairs, interior repairs, body repairs, paint, wash, polish, etc. as well as including one or more parking (e.g., staging) areas.

The vehicle can also be assigned an identifier and fitted with one or more transmitters. Different transmitters can use different technologies and can indicate vehicle location with different precisions. As a vehicle is moved between workstations and/or staging areas, the one or more transmitters can continually transmit. Depending on the technology, different receivers can receive the transmissions.

In one aspect, a (e.g., GPS) transmitter transmits its location (and thus the vehicle's location) to a server. The server stores the location in a state database. In another aspect, a (e.g., Bluetooth Low Energy ("BLE")) transmitter transmits a signal in the vicinity of a localized (e.g., workstation) computer system. The localized computer system derives the vehicle location from the transmission strength. The localized computer system sends the vehicle location to the server. The server stores the location in the state database.

As such, the tracking database stores vehicle locations over time. The server can use the tracking database to track the path of the vehicle throughout different locations in the maintenance facility. The server can also use the tracking database to determine how long a vehicle has been at a particular location, such as, for example, in a parking or at a workstation.

At essentially anytime, the server can access vehicle historical state from the tracking database (either automatically or in response to manually entered commands). The vehicle historical state data can indicate the vehicle's progression through the vehicle maintenance workflow in real time, including when the vehicle entered at least one location in the ordered sequence of locations. A service manager, estimator, or automated system can determine a sequence location, in the ordered sequence of locations, where the vehicle is to be located based on the historical vehicle state data.

Transmissions from the at least one of the one or more transmitters can be accessed. A proximal current vehicle location is derived from the transmissions. It is determined how long the vehicle has been at the proximal current vehicle location based on the historical state data. An electronic component is activated based on the determination. Activation of an electronic component can include activating a component used for vehicle maintenance or activating notification component used to notify service personnel, an estimator, an insurance company, etc.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
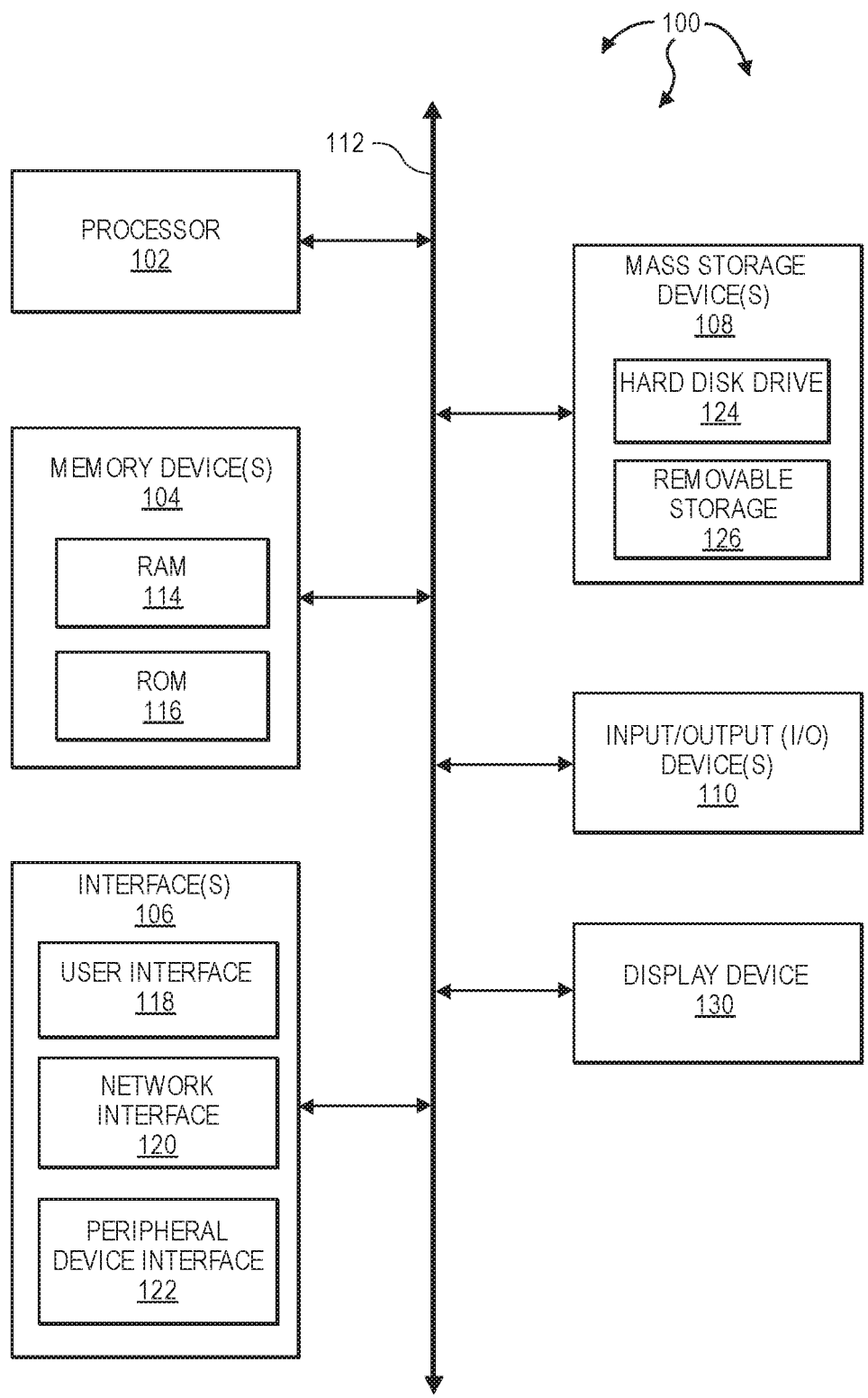
FIG. 1 illustrates an example block diagram of a computing device.

Examples extend to methods, systems, and computer program products for electronically tracking vehicle state in a vehicle maintenance facility or vehicle collision repair facility.

When a vehicle enters a collision repair or maintenance (e.g., repair, paint, etc.) facility, maintenance facility personnel can assess the vehicle and determine a vehicle maintenance and/or repair workflow for performing indicated maintenance or repairs. The maintenance personnel can assign the vehicle maintenance and/or repair workflow to the vehicle. The vehicle maintenance workflow defines an ordered sequence of locations the vehicle is to pass through and corresponding time constraints per location to complete a vehicle maintenance process. At least some locations in the ordered sequence include workstations corresponding to maintenance tasks to be performed on the vehicle. For example, locations can include workstations for performing one or more of: mechanical repairs, interior repairs, body repairs, paint, wash, polish, etc. as well as including one or more parking (e.g., staging) areas.

The vehicle can also be assigned an identifier and fitted with one or more transmitters. Different transmitters can use different technologies and can indicate vehicle location with different precisions. As a vehicle is moved between workstations and/or staging areas, the one or more transmitted continually transmit. Depending on the technology, different receivers can receive the transmissions.

In one aspect, a (e.g., GPS) transmitter transmits its location (and thus the vehicle's location) to a server. The server stores the location in a state database. In another aspect, a (e.g., Bluetooth Low Energy ("BLE")) transmitter transmits a signal in the vicinity of a localized (e.g., workstation) computer system. The localized computer system derives the vehicle location from the transmission strength. The localized compute system sends the vehicle location to the server. The server stores the location in the state database.

As such, the tracking database stores vehicle locations over time. The server can use the tracking database to track the path of the vehicle throughout different locations in the collision repair or maintenance facility. The server can also use the tracking database to determine how long a vehicle has been at a particular location, such as, for example, in a parking or at a workstation.

At essentially anytime, the server can access vehicle historical state from the tracking database (either automatically or in response to manually entered commands). The vehicle historical state data can indicate the vehicle's progression through the vehicle maintenance and/or collision repair workflow, including when the vehicle entered at least one location in the ordered sequence of locations. A service manager, estimator, or automated system can determine a sequence location, in the ordered sequence of locations, where the vehicle is to be located based on the historical vehicle state data.

Transmissions from the at least one of the one or more transmitters can be accessed. A proximal current vehicle location is derived from the transmissions. It is determined how long the vehicle has been at the proximal current vehicle location based on the historical state data. An electronic component is activated based on the determination. Activation of an electronic component can include activating a component used for vehicle maintenance or activating notification component used to notify service personnel, an estimator, an insurance company, etc.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
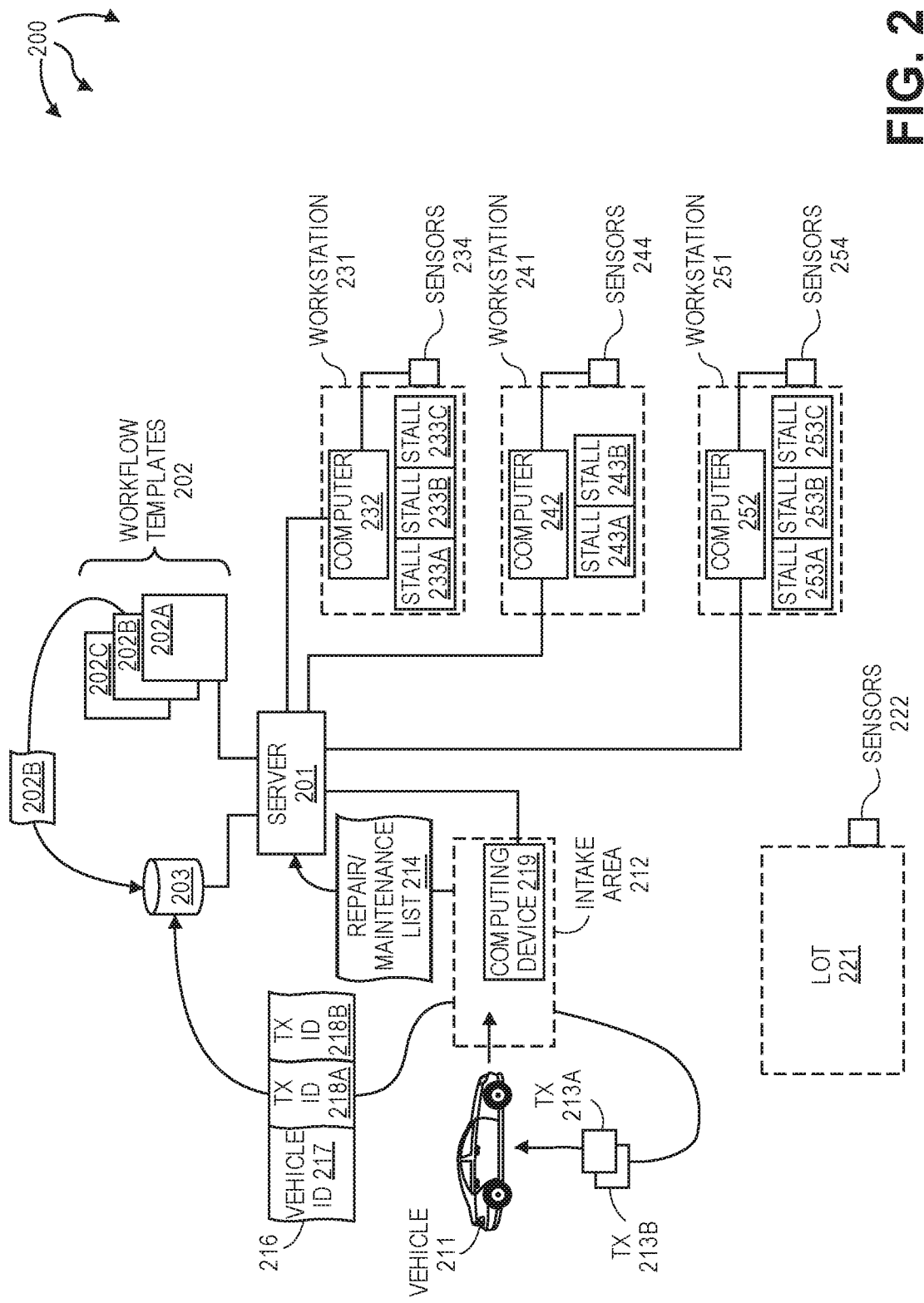
FIG. 2 illustrates an example architecture of a vehicle collision or maintenance facility.

FIG. 2 illustrates an example architecture of a vehicle collision repair or maintenance facility 200. As depicted, architecture 200 includes server 201, workflow templates 202, database 203, intake area 212, lot 221, workstation 231, workstation 241, and workstation 251. Workstation 231 includes computer 232, sensors 234, and stalls 233A, 223B, and 233C. Workstation 241 includes computer 242, sensors 244, and stalls 243A and 243B. Workstation 251 includes computer 252, sensors 254, and stalls 253A, 253B, and 253C. Lot 221 includes sensors 222. Intake area 212 includes computing device 219.

Server 201, workflow templates 202, database 203, computer 232, computer 242, computer 252, sensors 234, sensors 244, sensors 254, sensors 222, and computing device 219 can be connected to (or be part of) a network, such as, for example, a system bus, a Local Area Network ("LAN"), a Wide Area Network ("WAN"), and even the Internet. Accordingly, Server 201, computer 232, computer 242, computer 252, sensors 234, sensors 244, sensors 254, sensors 222, and computer device 219 as well as any other connected computer systems and devices (e.g., transmitters) and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Each of server 201, computer 232, computer 242, computer 252, or computing device 219 can include any of the components described with respect to computing device 100.

In general, sensors can be used to sense environmental characteristics, detect objects (or portions thereof), etc. Sensors can include cameras, motion sensors, temperature sensors, environmental gas compositions sensors (e.g., $CO_2$), lighting sensors, pressure sensors, etc. Sensors can also include receivers that receive (sense) signals from transmitters.

Transmitters and/or receivers can implement any of a wide variety of different technologies, including but not limited to: Ultra-wide band (UWB), Bluetooth Low Energy (BLE), Cellular, Radio-frequency identification (RFID), Global Positioning System (GPS), Global Navigation Satellite System (GLONASS), Differential GPS, IEEE 802.11 Received Signal Strength Indication (RSSI) (Wi-FI, etc.), IEEE 802.15.4 (Zigbee, Xbee, mesh networks), image based/Camera Systems, ultrasonic, infrared, Magnetic positioning, visible light communication, Micro-Electro-Mechanical System on Inertial Measurement Unit (MEMS/IMU), Pseudo-Satellites (Pseudolites), Laser, LIDAR, etc.

In one aspect, a transmission includes digital data. For example, a GPS device can transmit GPS coordinates of the GPS device to a receiver (e.g., via wireless network protocols). A receiver can relay the digital data to a computing device. In another aspect, a transmission does not include digital data. A receiver measures the signal strength of a transmission and relays the signal strength to a computing device.

Database 203 can store vehicle database entries corresponding to vehicles entering (or that have previously been at) vehicle maintenance facility 200. A vehicle database entry can include fields containing any of: a customer identifier, a vehicle identifier (e.g., a vehicle identification number (VIN) or portion thereof (e.g., a serial number) or license plate number), any previous work performed on a vehicle, if a vehicle is currently associated with a workflow template, progress through an associated workflow template, a vehicle location, duration of time a vehicle has been at a vehicle location, transmitter identifiers for transmitters currently associated with a vehicle, etc.

Workflow templates 202 can include a plurality of workflow templates, such as, for example, workflow templates 202A, 202B, 202C, etc. Each workflow template defines a vehicle collision repair and/or maintenance process. A workflow collision repair and/or maintenance process can indicate an ordered sequence of locations a vehicle is to pass through and corresponding time constraints per location to complete vehicle repairs and/or maintenance. Locations in the ordered sequence of locations can include one or more workstations (e.g., mechanical repair, interior repair, body repair, paint, wash, polish, quality assurance, etc.) and one or more staging areas (e.g., parking lots).

At intake area 212, service personnel can use computing device 219 to interact with vehicle database 203 (e.g., through interoperation with server 201). Computing device 219 can be used to read from vehicle database 203, write to vehicle database 203, etc. When a vehicle enters intake area 212, service personnel can determine a vehicle identifier (e.g., VIN, license plate number, etc.) associated with the vehicle.

Service personnel can use computing device 219 (e.g., through a user interface) to query database 203 for the vehicle identifier. If the vehicle identifier is located in vehicle database 203 (and thus the vehicle was previously at vehicle maintenance facility 200), vehicle database 203 can return a vehicle database entry corresponding to the vehicle identifier back to computing device 219. If the vehicle identifier is not located in vehicle database 203, vehicle database 203 can indicate to computing device 219 that the vehicle identifier was not found.

When a vehicle identifier is not found, service personnel can use computing device 219 to create a vehicle database entry for the vehicle and assign the vehicle identifier and a customer identifier to the vehicle database entry.

Service personnel can use computing device 219 to indicate desired repairs and/or maintenance operations for a vehicle to server 201. Server 201 can match desired repairs and/or maintenance operations to a corresponding workflow template 202 that defines an ordered sequence of locations to implement the desired repairs and/or maintenance. Server 201 can assign the matching workflow template 202 to the vehicle, for example, by appending the matching workflow template to a vehicle database entry for the vehicle.

Service personnel can also attach one or more transmitters to the vehicle and/or place one or more transmitters in the vehicle. Service personnel can use computing device 219 to append transmitter identifiers for any transmitters associated with a vehicle to the vehicle database entry corresponding to the vehicle.

Accordingly, database 203 can store and maintain a vehicle database entry for each vehicle that has been or is being worked on at vehicle maintenance facility 200. Each vehicle database entry can include fields containing a vehicle ID, one or more corresponding transmitter IDs, and a workflow template for a vehicle. A vehicle database entry can also include one or more fields used to track vehicle progress through a workflow template, such as, for example, fields for storing current time and location, fields for storing total time at current workstation, fields for storing total time at prior workstations, fields for storing time in a staging area (e.g., a parking lot) since leaving the last work station, etc.

It may be that a vehicle is temporarily transferred from vehicle collision repair or maintenance facility 200 to another vehicle maintenance facility. For example, vehicle maintenance facility 200 may lack equipment, expertise, personnel, etc. to perform a type or repair. As such, the vehicle is moved to another vehicle maintenance facility to perform the type of repair and then returned back to vehicle maintenance facility 200. Upon return, the vehicle can be returned to a previously assigned workflow template.

Figure 3:
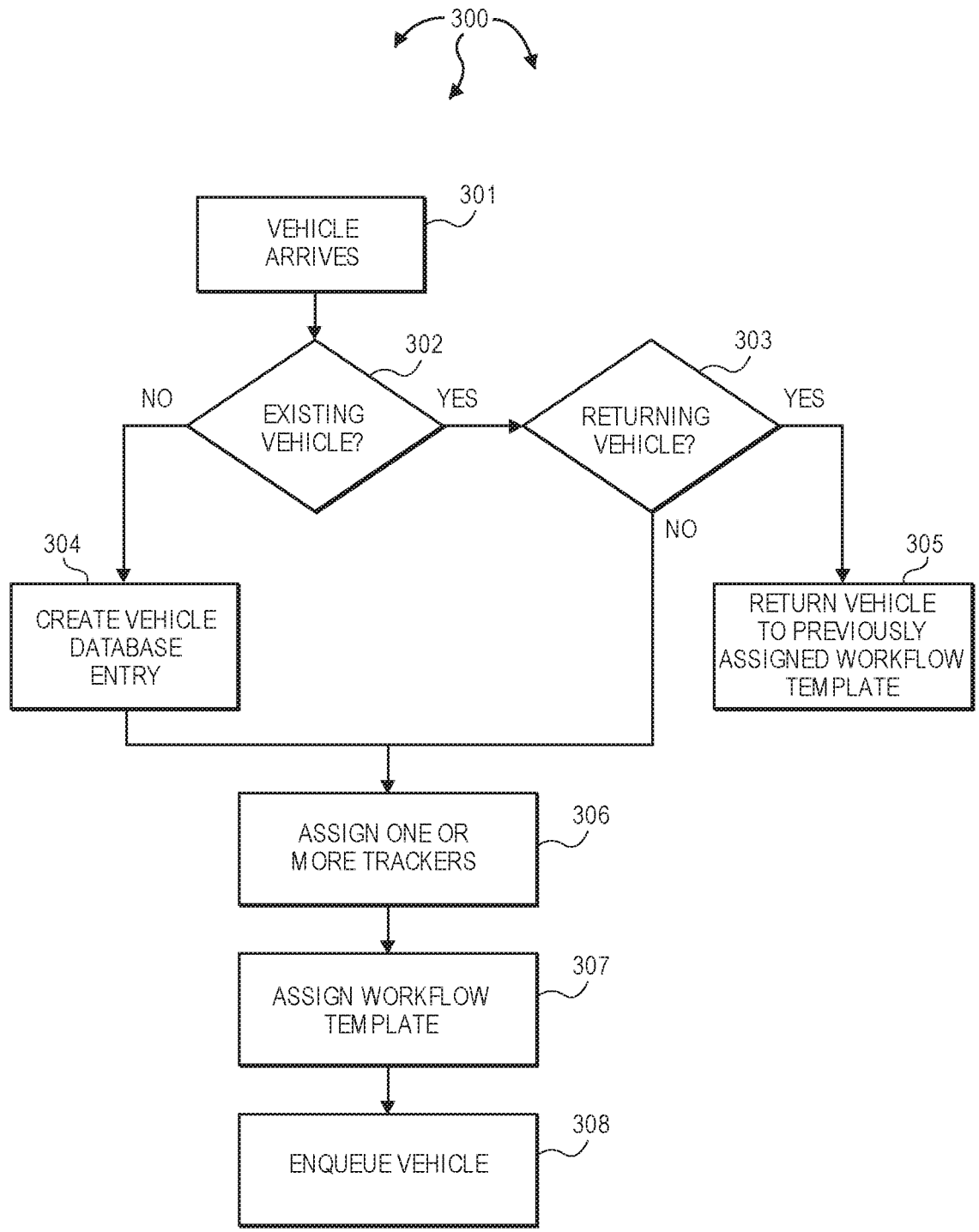
FIG. 3 illustrates a flow chart of an example method for vehicle intake.

FIG. 3 illustrates a flow chart of an example method 300 for vehicle intake. Method 300 will be described with respect to the components and data depicted in the architecture for vehicle maintenance facility 200.

Method 300 includes a vehicle arriving (301). For example, vehicle 211 can arrive at intake area 212. Vehicle 211 can be a car, truck, van, bus, semi, motorcycle, etc. Method 300 includes determining if the vehicle is an existing vehicle (302). For example, service personnel can observe that vehicle identifier 217 (e.g., a VIN or a license plate number) is associated with vehicle 211. Service personnel can use computer device 219 to query database 203 with vehicle identifier 217. If a vehicle database entry corresponding vehicle identifier 217 is returned from database 203, vehicle 211 is an existing vehicle (i.e., vehicle 211 has previously gone through an intake process at vehicle maintenance facility 200). If an identifier not found message is returned from database 203, vehicle 211 is not an existing vehicle (i.e., database 203 does not include a database entry for vehicle 211).

If the vehicle is an existing vehicle (YES at 302), method 300 includes determining if the vehicle is a returning vehicle (303). If the vehicle is a returning vehicle (YES at 303), method 300 includes returning the vehicle to a previously assigned workflow process (305). For example, service personnel can use computing device 219 to query database 203 to determine if vehicle 211 is in a previously assigned workflow template. It may be that vehicle 211 was previously assigned to a workflow template. As part of the previously assigned workflow template, one or more maintenance activities may have been performed on vehicle 211 at vehicle maintenance facility 200. Subsequently, vehicle 211 was transferred to another vehicle maintenance facility (e.g., for specialized work). Upon transfer back to vehicle maintenance facility 200, vehicle 211 can be re-entered into the previously assigned workflow template from where it left off.

If a vehicle is not an existing vehicle (NO at 304), method 300 includes creating a vehicle database entry (304). For example, service personnel can use computing device 219 to create a vehicle database entry for vehicle 211. A vehicle database entry can include fields for a vehicle identifier, vehicle make and model, vehicle owner, etc. The service personal can used computing device 219 to enter relevant information for vehicle 211 into the fields.

If the vehicle is not a returning vehicle (NO at 305) or after creating a vehicle database entry, method 300 includes assigning one or more trackers (306). For example, service personnel can attach transmitter 213A and/or transmitter 213B to vehicle 211 and/or place transmitter 213A and/or transmitter 213B in vehicle 211. Service personnel can enter transmitter IDs 218A and 218B corresponding to transmitters 213A and 213B respectively into vehicle database entry 216.

Transmitters 213A and 213B can be different types of transmitters. In one aspect, transmitter 213A has increased transmission range ranger relative to transmitter 213B but transmitter 213A transmits location with less precision than transmitter 213A. For example, transmitter 213A can be in a GPS device that transmits location coordinates out to a half mile from the GPS device. The location coordinates have a precision to within about 20 feet. Transmitter 213B can be a proximity transmitter that transmits a signal with reduced signal strength (e.g., BLE). The signal strength is detected by a corresponding receiver when the transmitter is within about three feet of the receiver. Other combinations of described transmitters are also possible. A selected combination of transmitters can be used to facilitate combinations of increased transmission range and increased location precisions.

Method 300 includes assigning a workflow template (307). For example, service personnel can enter repair/maintenance list 214 at computing device 219. Repair/maintenance list 214 can include a list of repair and/or maintenance activities (e.g., mechanical repair, body repair, paint, etc.) to be performed on vehicle 211. Computing device 219 can send repair/maintenance list 214 to server 201. Server 201 can match repair/maintenance list 214 to (repair and/or maintenance) workflow template 202B. Server 201 can append workflow template 202B to vehicle database entry 216. Server 201 can also append appropriate fields to vehicle database entry 216 so that server 201 can subsequently track progress of vehicle 211 through workflow template 202B.

Method 300 includes enqueuing the vehicle (308). For example, server 201 can enqueue workflow template 202B to be performed on vehicle 211. Vehicle 211 (including transmitters 213A and 213B) can then be moved from intake area 212 to an appropriate location. The appropriate location can be a first workstation in workflow template 202B. Alternately, the appropriate location can be lot 221 (where vehicle 211 can stay until resources of the first workstation become available).

Figure 4:
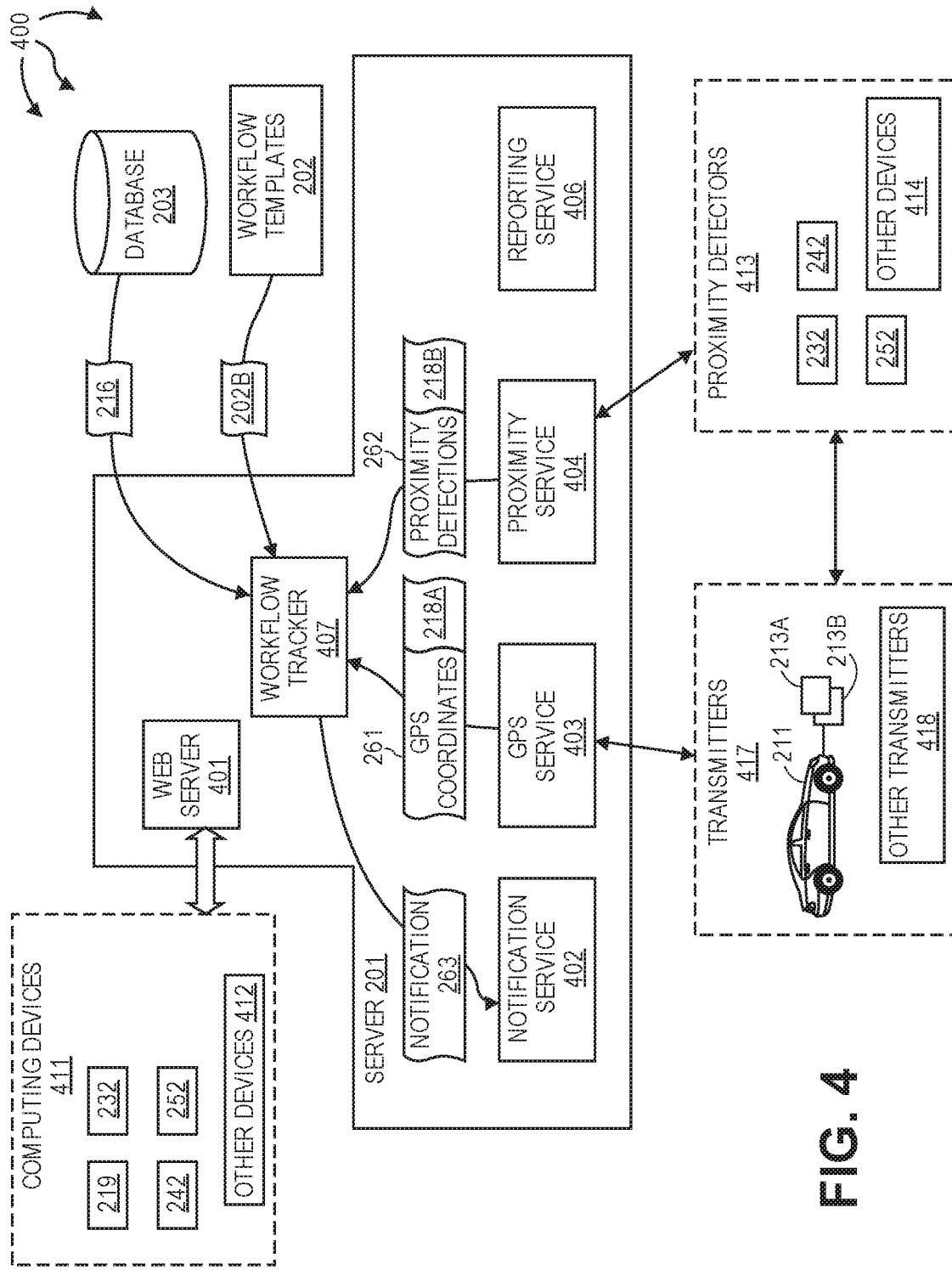
FIG. 4 illustrates an example computer architecture facilitating tracking vehicles in a vehicle maintenance facility.

FIG. 4 illustrates an example computer architecture 400 facilitating tracking vehicles in a vehicle maintenance facility. As depicted, computer architecture 400 includes server 201, workflow templates 202, database 203, computing devices 411, proximity detectors 413, and transmitters 417. Computer devices 411 includes computing device 291, computers 232, 242, and 252, and other devices 412. Other devices 413 can include other computers, tablets, mobile phones, etc. Transmitters 416 includes transmitters 213A and 213B in vehicle 211. Other transmitters 418 can include transmitters in other vehicles.

Proximity detectors 413 include proximity detectors in computers 232, 242, and 252 as well as proximity detectors in other computers. Proximity detectors 413 are configured to detect proximity transmitters and corresponding transmitter identifiers included in transmitters 417.

As described, a workstation can include multiple stalls. For example, workstation 231 includes stalls 233A, 233B, and 233C. A workstation computer can include a proximity detector corresponding to each stall and/or can include proximity detector that is capable of distinguishing between proximity detections originating from different stalls. For example, computer 232 can include one or more proximity detectors configured to distinguish between proximity transmissions from stalls 233A, 233B, and 233C. As such, computer 232 can determine what stall from among 233A, 223B, and 223C contains what transmitter identifier.

Server 201 includes web server 401, notification service 402, GPS server 403, proximity service 404, reporting service 406, and workflow tracker 407. GPS transmitters can transmit GPS coordinates at specified intervals, for example, one a second. GPS service 403 is configured to receive GPS coordinates and transmitter identifiers transmitted from GPS transmitters in transmitters 417. GPS service 403 can send received GPS coordinates and transmitter identifiers to workflow tracker 407. Proximity service 404 is configured to receive proximity detections and transmitter identifiers from proximity detectors 413. Proximity service 404 can send proximity detections and transmitter identifiers to workflow tracker 407. Proximity detectors can send indications of detected proximity transmitters at specified intervals, for example, once a second.

Server 201 can also include other services configured to receive transmissions from other types of described transmitters and/or receive detections from other types of described detectors.

Notification service 402 is configured to send notifications to relevant parties (e.g., service manager, rider, insurance company, vehicle owner, etc.) when an anomaly is detected in a vehicle's workflow progression.

Workflow tracker 407 is configured to track the progress of a vehicle through a workflow template. Workflow tracker can receive GPS coordinates and/or proximity detections from GPS service and proximity service 404 respectively. Workflow tracker 407 can also access vehicle database entries from database 203 and workflow templates from workflow templates 202. Workflow tracker 407 can determine if a vehicle is appropriately progressing through a workflow template. Workflow template progression can be determined based on GPS coordinates and/or proximity detections associated with the vehicle in view of historical data in a vehicle database entry for the vehicle and workflow template rules. Historical data can include prior and current vehicle locations and duration at a current vehicle location. Anomalies can include a vehicle being at a workstation for too long, a vehicle being in a staging area (e.g., lot) for too long between workstations, a vehicle being out of a vehicle maintenance facility for too long (e.g., for specialized maintenance), a vehicle waiting for parts for too long, etc.

When an anomaly is detected, workflow tracker 407 can send a notification to notification service 402. Notification service 402 can in turn notify a relevant entity of the anomaly by short message service (SMS) message, email, web push, or other electronic message type. Relevant parties can include estimators, technicians, managers, insurance company, or vehicle owner Reporting service 406 is configured to generate analytical reports indicating the performance of vehicle maintenance facility 200. Reporting service 406 can access historical vehicle data from database 203 and/or data from workflow templates 202. Reporting service can use the historical vehicle data and data from workflow templates 202 to generate analytical reports, such as, for example, average repair time by repair type, average repair time per workstation, average repair time per technician, average repair times by vehicle make and model, average repair time per estimator, etc.

Web server 401 provides a web interface for interacting with server 201, database 203, and workflow templates 203. Users at computing devices 411 can communicate with web server 401 through corresponding web browsers to interact with server 201, workflow templates 202, and data in database 203.

Figure 5:
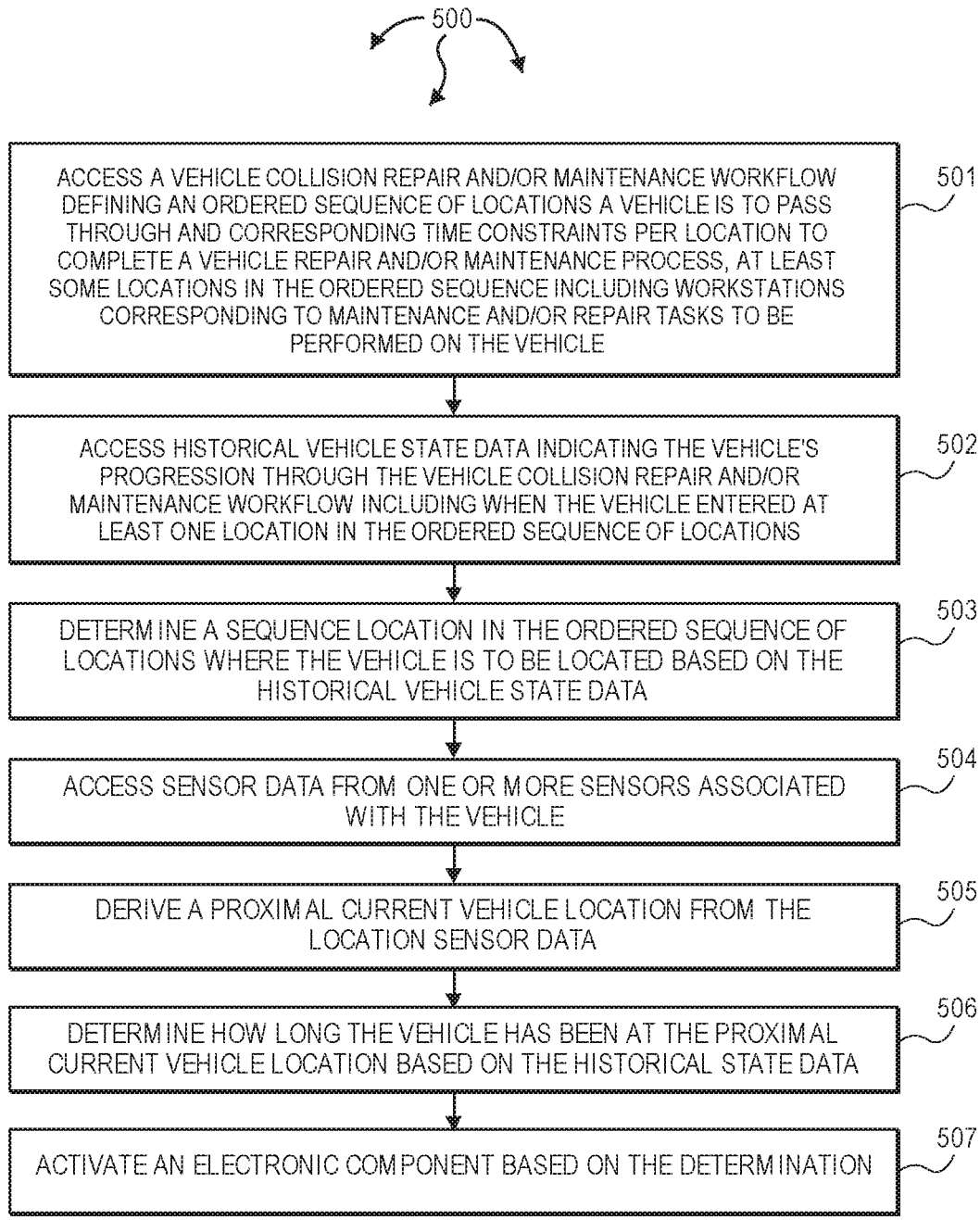
FIG. 5 illustrates a flow chart of an example method for electronically tracking a vehicle in a vehicle maintenance facility.

FIG. 5 illustrates a flow chart of an example method 500 for electronically tracking a vehicle in a vehicle maintenance facility. Method 500 will be described with respect to the components and data in computer architecture 400.

In one aspect, transmitter 213A is a GPS transmitter and transmitter 213B is a BLE transmitter. As described, transmitters 213A and 213B can be configured to transmit at specified and potentially different intervals. In one aspect, a specified interval is once per second. In another aspect, a specified interval is between twice per second (i.e., once every 0.5 seconds) and once every five seconds. In a further aspect, a specified interview is between four times per second (i.e., once every 0.25 seconds) and once every 10 seconds. Thus, transmitter 213A can transmitter GPS coordinates 261 and transmitter identifier 213A to GPS service 403. GPS server 403 can forward GPS coordinates 261 and transmitter identifier 213A to workflow tracker 407.

Transmitter 213B can transmit a BLE signal and transmitter identifier 218B. One or more proximity detectors 413 can detect the BLE signal and transmitter identifier 413. The one or more proximity detectors detect transmitter 213B in proximity based the BLE signal. The one or more proximity detectors can send proximity detections 262 and transmitter identifier 218B to proximity service 404. Proximity service 404 can forward proximity detections 262 and transmitter identifier 218B to workflow tracker 407.

As such, the location of vehicle 211 can be determined/updated at essential the same specified intervals used for signal transmission. The location of vehicle 211 can be determined with less precision when out of range of any proximity detectors and with more precision when in range of one or more proximity detectors. GPS service 403 can send GPS coordinates 261 and transmitter identifier 218A to workflow tracker 407 as GPS coordinates 261 are received from transmitter 213A. Similarly, proximity service 404 can send proximity detections 262 and transmitter identifier 218B to workflow tracker 407 as proximity detections 262 are received from proximity detectors 413.

In one aspect, transmitter 213B transmits more frequently than transmitter 213A. Since transmitter 213B may have a shorter range, transmitter 213B can come into and out of range of sensors and/or detectors more often. Transmitting more frequently allows sensors and/or detectors to more effectively determine when transmitter 213B is detected and when detection of transmitter 213B is lost.

Method 500 includes accessing a vehicle collision repair and/or maintenance workflow defining an ordered sequence of locations a vehicle is to pass through and corresponding time constraints per location to complete a vehicle repair and/or maintenance process, at least some locations in the ordered sequence including workstations corresponding to repair and/or maintenance tasks to be performed on the vehicle (501). For example, workflow tracker 407 can access workflow template 202B. Workflow template 202B defines an ordered sequence of locations vehicle 211 is to pass through and corresponding constraints per location (rules) to complete a vehicle maintenance process. For example, workflow template 202B can define that vehicle 211 is to start at workstation 241 for mechanical repairs, spend no more than 3 days at workstation 241, then proceed to workstation 251 for body work, spend no more than 2 days at workstation 251, then proceed to workstation 231 for paint, and spend no more than 2 days at workstation 231. Workflow template 202B can also define that vehicle 211 is not to sit in lot 221 for more than 24 hours before, between, or after workstations.

As vehicle 211 progresses between locations, workflow tracker 407 can continual update the location and duration at location of vehicle 211 in vehicle database entry 216 based on GPS coordinates and/or proximity detentions.

Method 500 includes accessing historical vehicle state data indicating the vehicle's progression through the vehicle repair and/or maintenance workflow including when the vehicle entered at least one location in the ordered sequence of locations (502). For example, workflow tracker 407 can access vehicle database entry 216 from database 203. Vehicle database entry 216 can indicate vehicle 211's progression through workflow template 202B, including current location, duration at current location, and durations at past locations. Vehicle 211's progression can include when vehicle 211 entered workstation 251.

Method 500 includes determining a sequence location in the ordered sequence of locations where the vehicle is to be located based on the historical vehicle state data (503). For example, based on when vehicle 211 started workflow template 202B, location constraints (rules), and historical state data for vehicle 211, workflow tracker 407 can determine where in workflow template 202B vehicle 211 is to be located. For example, five days after starting workflow template 202B (as defined with respect to 501) in it is appropriate for vehicle 211 to be at workstation 251 or have recently returned to lot 221 from workstation 251. However, five days after starting workflow template 202B (as defined with respect to 501) it is not appropriate for vehicle 211 to still be at workstation 241.

Method 500 includes accessing sensor data from one or more sensors associated with the vehicle (504). For example, workflow tracker 407 can access GPS coordinates 261 from GPS service 403 and/or can access proximal detections 262 from proximity service 404. GPS coordinates 261 are associated with transmitter ID 218A corresponding to transmitter 213A. Similarly, proximity detections are associated with transmitter ID 218B corresponding to transmitter 213B.

Method 500 includes deriving a proximal current vehicle location from the location sensor data (505). For example, workflow tracker 407 can derive a location of vehicle 211 from GPS coordinates 261 and/or proximal detections 262. Workflow tracker 407 can refer to vehicle database entry 216 to determine that transmitter identifiers 218A and 218B correspond to transmitters 213A and 213B in and/or attached to vehicle 211. Method 500 includes determining how long the vehicle has been at the proximal current vehicle location based on the historical state data (506). For example, workflow tracker 407 can determine how long vehicle 211 has been at a current location based on historical state data in vehicle database entry 216.

Method 500 includes activating an electronic component based on the determination (507). In one aspect, workflow tracker 407 determines that vehicle 211 has been in a current location for a period of time violating time constraints of workflow template 202B. In response, workflow tracker 407 can activate notification service 402. Workflow tracker 407 can send notification 263 notification service 402. Notification service 402 can forward notification 402 as an SMS message, email, web push, etc. to relevant parties, including estimators, technicians, managers, insurance company, or vehicle owner. In another aspect, workflow tracker determines that vehicle 211 has been at a workstation within the time constraints of workflow template 202B. In response, workflow tracker 407 can automatically energize or turn on maintenance equipment, initiate an equipment startup sequence, etc.

In some aspects, modules of server 201 normalize signal noise and determine signal accuracy. Proximity service 404 can also deduplicate proximity detections. Proximity service 404 can also perform pre-processing on proximity detections to distinguish newer proximity detections (e.g., transmitters recently detected by a proximity detector) from existing proximity detections (e.g., a detecting the same transmitter in proximity to a workstation for multiple days).

In one aspect, transmitters are also attached to vehicle keys and vehicle key fobs. Thus, workflow tracker 407 can also track the location of keys and key fobs.

In a further aspect, transmitters also attached to service personnel badges. Thus, workflow tracker 407 can also track service personnel. If a vehicle has been at a workstation for a specified period of time without any service personnel nearby, workflow tracker can send a notification to relevant parties.

Other sensors, such as, sensors 222, 234, 244, and 254 can be used to validate a vehicle location. For example, cameras can be used to verify license plates enter/leaving lot 221, workstation 231, workstation 241, workstation 251, etc.

Figure 6:
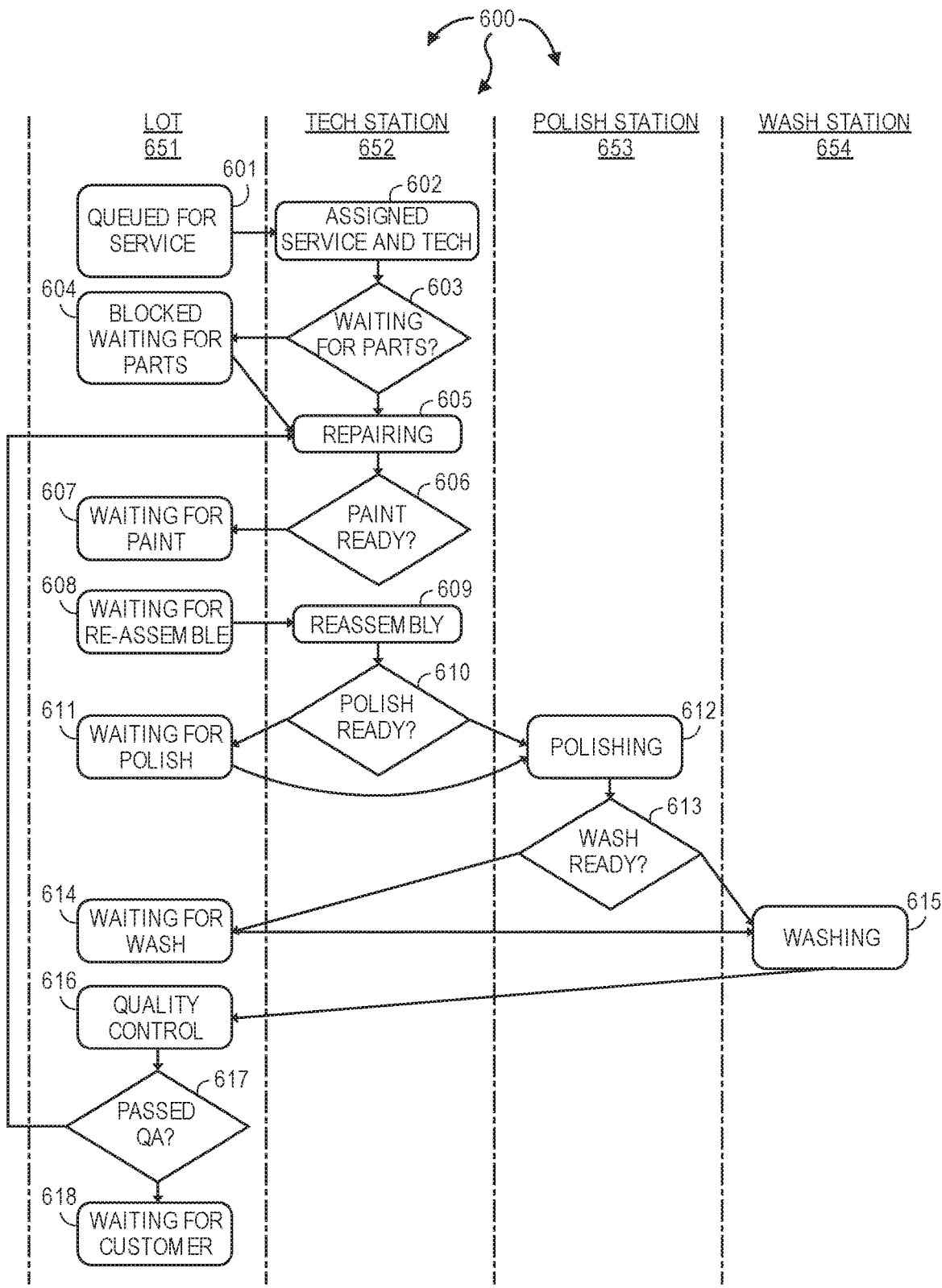
FIG. 6 illustrates a flow of an example method for electronically tracking a vehicle moving between different physical locations in a vehicle maintenance facility.

FIG. 6 illustrates a flow of an example method 600 for electronically tracking a vehicle moving lot 601, tech station 603, polish station 603, and wash station 604 at a vehicle maintenance facility. Method 600 includes queuing a vehicle for service in lot 651 (601). Method 600 includes assigning the vehicle to service and tech at tech station 652 (602). Method 600 includes waiting for parts (603). If waiting for parts blocks repair, the vehicle can be moved temporarily back to lot 651 (604). The vehicle can be repaired at tech station 652 (605).

If paint is not ready (606), the vehicle can be moved back to lot 651. The vehicle can wait in lot 651 until paint is ready (607). It may be that paint is performed in a different vehicle maintenance facility and painted parts are delivered. The vehicle can wait in lot 651 for re-assembly (608). The vehicle can be reassembled at tech station 652 (609). If polish is ready (YES at 610), the vehicle can be moved to polish station 653. If polish is not ready (NO at 610), the vehicle can be temporarily moved to lot 651 prior to being moved to polish station 653 (611). The vehicle can be polished at polish station 653 (612).

If wash is ready (YES at 613), the vehicle can be moved to wash station 654. If wash is not ready (NO at 613), the vehicle can be temporarily moved to lot 651 prior to being moved to wash station 655 (614). The vehicle can be washed at wash station 654 (615). The vehicle can then be moved back to lot 651 (or to a Quality Assurance station) for quality control checking (616). If quality control checking is passed (YES at 617), the vehicle can remain in lot 651 for customer pickup (618). If quality control fails (NO at 617), the vehicle can be returned to tech station 652 for further repairs.

Figure 7A:
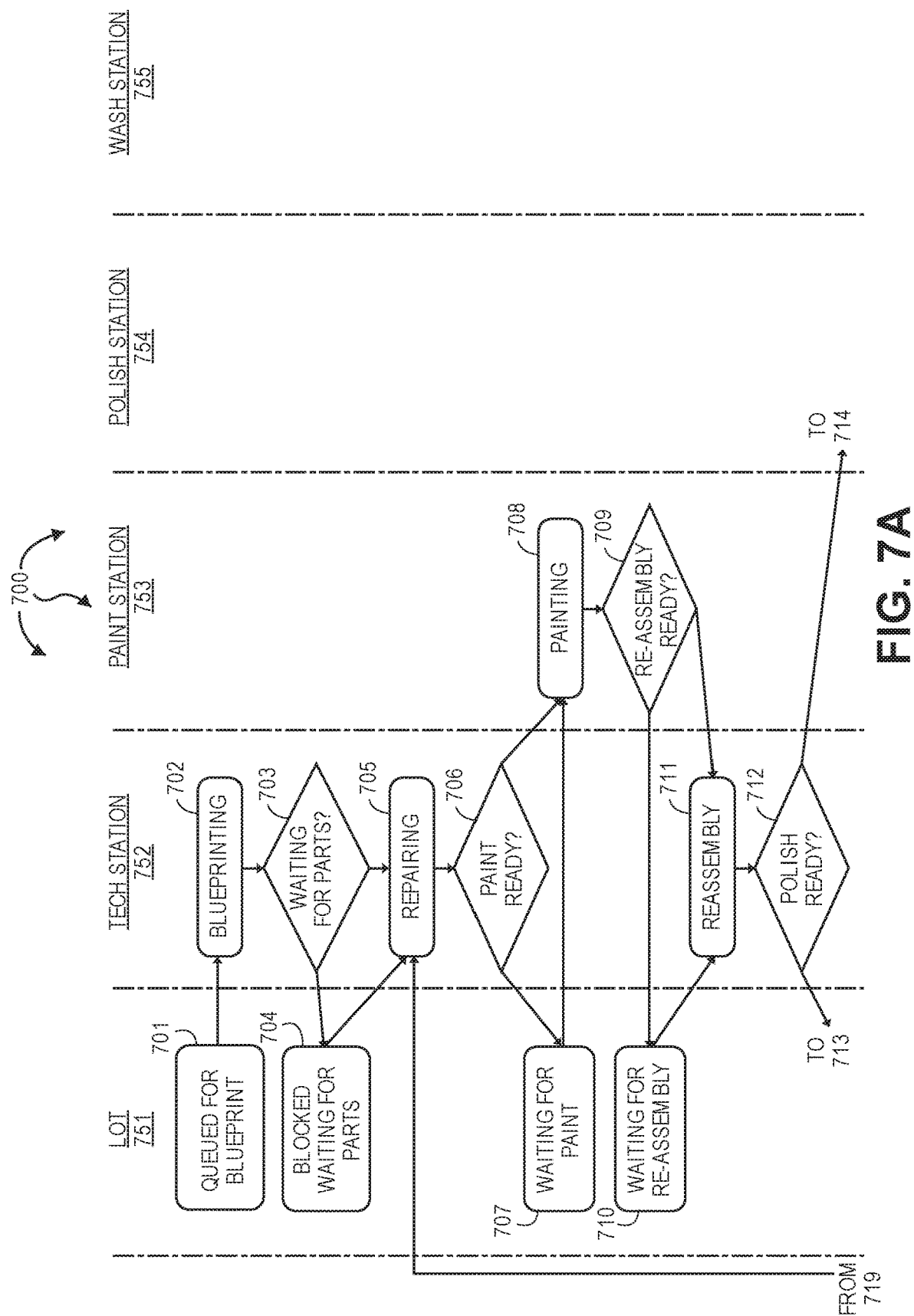
FIG. 7 illustrates a flow of an example method for electronically tracking a vehicle moving between different physical locations in a vehicle maintenance facility.
Figure 7B:
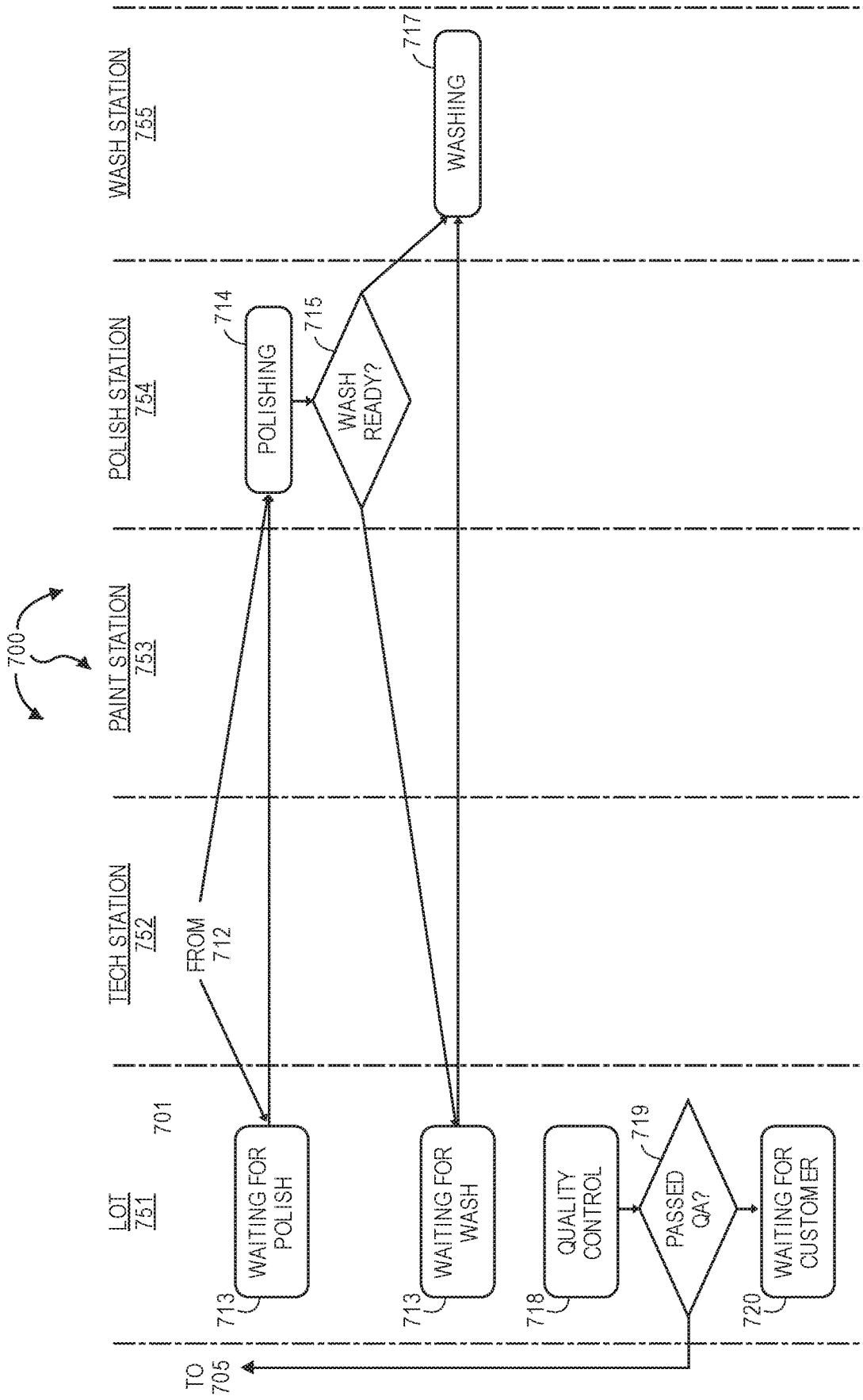

FIG. 7 illustrates a flow of an example method 700 for electronically tracking a vehicle moving between lot 751, tech station 752, paint station 753, polish station 754, and wash station 755 at a vehicle maintenance facility. Method 700 includes queuing a vehicle for blueprint in lot 751 (701). Method 700 includes blueprinting the vehicle at tech station 752 (702). Method 700 includes waiting for parts (703). If waiting for parts blocks repair, the vehicle can be moved temporarily back to lot 751 (704). The vehicle can be repaired at tech station 752 (705).

If paint is not ready (706), the vehicle can be moved back to lot 751. The vehicle can wait in lot 751 until paint is ready (707). The vehicle can be painted at paint station 753 (708). If reassembly is not ready (709), the vehicle can be moved back to lot 751. The vehicle can be reassembled at tech station 752.

If polish is ready (YES at 712), the vehicle can be moved to polish station 754. If polish is not ready (NO at 712), the vehicle can be temporarily moved to lot 751 prior to being moved to polish station 754 (713). The vehicle can be polished at polish station 754 (714).

If wash is ready (YES at 715), the vehicle can be moved to wash station 755. If wash is not ready (NO at 715), the vehicle can be temporarily moved to lot 751 prior to being moved to wash station 755 (716). The vehicle can be washed at wash station 755 (717). The vehicle can then be moved back to lot 751 (or to a Quality Assurance station) for quality control checking 718. If quality control checking is passed (YES at 719), the vehicle can remain in lot 651 for customer pickup (720). If quality control fails (NO at 719), the vehicle can be returned to tech station 752 for further repairs.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: vehicle identifiers, transmitter identifiers, vehicle database entries, workflow templates, time constraints, maintenance lists, notifications, reports, GPS coordinates, proximity detections, other location data, other sensor data, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, vehicle identifiers, transmitter identifiers, vehicle database entries, workflow templates, time constraints, maintenance lists, notifications, reports, GPS coordinates, proximity detections, other location data, other sensor data, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system comprising:
a processor;
system memory coupled to the processor and storing instructions configured to cause the processor to:
access a vehicle maintenance workflow defining:
a plurality of maintenance tasks, including at least a first task and a second task, to be performed sequentially to complete a vehicle maintenance process, the first task modifying a physical component of a vehicle, performance of the second task dependent on completion of the physical component modification and the second task to be performed after the first task to at least partially complete the vehicle maintenance process;
an ordered sequence of locations the vehicle is to move between, each location in the ordered sequence of locations corresponding to one or more tasks included in the plurality of maintenance tasks, at least one location in the ordered sequence of locations including a maintenance workstation where the physical component modification is to occur, at least one other location in the ordered sequence of locations being where the second task is to be performed; and
corresponding time constraints per location per maintenance task in order to complete the vehicle maintenance process within a specified time period;
enqueue the vehicle maintenance workflow in association with initiating the vehicle maintenance process on a designated vehicle;
access historical vehicle state data indicating the designated vehicle's progression through the vehicle maintenance process including when the designated vehicle started the vehicle maintenance process and when the designated vehicle entered at least one location in the ordered sequence of locations;
determine a location in the ordered sequence of locations where the designated vehicle is to be currently located based on the historical vehicle state data and the corresponding time constraints;
access location sensor data from one or more sensors in another location, from among the ordered sequence of locations, via first wireless digital communication;
derive a proximal actual current location of the designated vehicle from the location sensor data;
determine how long the designated vehicle has been at the proximal actual current vehicle location and if performance of the first task and the second task comply with the corresponding time constraints;
automatically energize a mechanical tool associated with performing a mechanical repair of the vehicle based on the determination;
receive an image from a camera via second wireless digital communication; and
validate the proximal actual current vehicle location of the designated vehicle based on content of the image.

2. The system of claim 1, wherein instructions configured to determine if performance of the first task and the second task comply with corresponding time constraints comprise instructions configured to determine that performance of the first task and the second violate the corresponding time constraints; and
further comprising instructions configured to send a notification via third wireless communication to a computer system indicating violation with the corresponding time constraints.

3. The system of claim 1, wherein instructions configured to access a vehicle maintenance workflow defining a plurality of maintenance tasks including a first task and a second task comprise instructions configured to access a body repair task and a paint task that is dependent on completion of the body repair task.

4. The system of claim 1, wherein instructions configured to access a vehicle maintenance workflow defining a plurality of maintenance tasks including a first task and a second task comprise instructions configured to access a first mechanical repair task and a second mechanical repair task that is dependent on completion of the first mechanical repair task.

5. The system of claim 1, further comprising instructions configured to detect arrival of the designated vehicle at a repair shop; and
wherein instructions configured to enqueue the vehicle maintenance workflow comprise instructions configured to enqueue the vehicle maintenance workflow at the repair shop to manage performance of the vehicle maintenance process at the repair shop.

6. The system of claim 1, further comprising instructions configured to:
detect return of the designated vehicle at a repair shop;
determine that the vehicle maintenance workflow was previously enqueued for the designated vehicle;
determine a next location in the sequence of locations based on the historical state data;
instruct the designated vehicle to be moved to the next location via third wireless digital communication; and
send a notification via fourth wireless communication to a computer system indicating the designated vehicle movement instruction.

7. The system of claim 1, wherein instructions configured to access location sensor data comprise instructions configured to normalize signal noise associated with the location sensor data and determine signal accuracy associated with the location sensor data.

8. A method comprising:
accessing a vehicle maintenance workflow defining:
a plurality of maintenance tasks, including at least a first task and a second task, to be performed sequentially to complete a vehicle maintenance process, the first task modifying a physical component of a vehicle, performance of the second task dependent on completion of the physical component modification and the second task to be performed after the first task to at least partially complete the vehicle maintenance process;
an ordered sequence of locations the vehicle is to move between, each location in the ordered sequence of locations corresponding to one or more tasks included in the plurality of maintenance tasks, at least one location in the ordered sequence of locations including a maintenance workstation where the physical component modification is to occur, at least one other location in the ordered sequence of locations being where the second task is to be performed; and
corresponding time constraints per location per maintenance task in order to complete the vehicle maintenance process within a specified time period;

enqueueing the vehicle maintenance workflow in association with initiating the vehicle maintenance process on a designated vehicle;

accessing historical vehicle state data indicating the designated vehicle's progression through the vehicle maintenance process including when the designated vehicle started the vehicle maintenance process and when the designated vehicle entered at least one location in the ordered sequence of locations;

determining a location in the ordered sequence of locations where the designated vehicle is to be currently located based on the historical vehicle state data and the corresponding time constraints;

accessing location sensor data from one or more sensors in another location, from among the ordered sequence of locations, via first wireless digital communication;

deriving a proximal actual current location of the designated vehicle from the location sensor data;

determining how long the designated vehicle has been at the proximal actual current vehicle location and if performance of the first task and the second task comply with the corresponding time constraints; and automatically energizing a mechanical tool associated with performing a mechanical repair of the vehicle based on the determination;

receiving an image from a camera via second wireless digital communication; and validating the proximal actual current vehicle location of the designated vehicle based on content of the image.

9. The method of claim 8, wherein determining if performance of the first task and the second task comply with corresponding time constraints comprises determining that performance of the first task and the second violate the corresponding time constraints; and further comprising sending a notification via third wireless communication to a computer system indicating violation with the corresponding time constraints.

10. The method of claim 8, wherein accessing a vehicle maintenance workflow defining a plurality of maintenance tasks including a first task and a second task comprises accessing a body repair task and a paint task that is dependent on completion of the body repair task.

11. The method of claim 8, wherein accessing a vehicle maintenance workflow defining a plurality of maintenance tasks including a first task and a second task comprises accessing a first mechanical repair task and a second mechanical repair task that is dependent on completion of the first mechanical repair task.

12. The method of claim 8, further comprising detecting arrival of the designated vehicle at a repair shop; and wherein enqueueing the vehicle maintenance workflow comprises enqueueing the vehicle maintenance workflow at the repair shop to manage performance of the vehicle maintenance process at the repair shop.

13. The method of claim 8, further comprising:

detecting return of the designated vehicle at a repair shop;

determining that the vehicle maintenance workflow was previously enqueued for the designated vehicle;

determining a next location in the sequence of locations based on the historical state data;

instructing the designated vehicle to be moved to the next location via third wireless digital communication; and sending a notification via fourth wireless communication to a computer system indicating the designated vehicle movement instruction.

14. The method of claim 8, wherein accessing location sensor data comprises normalizing signal noise associated with the location sensor data and determining signal accuracy associated with the location sensor data.

* * * * *